(12) United States Patent
Kato et al.

(10) Patent No.: US 7,332,561 B2
(45) Date of Patent: *Feb. 19, 2008

(54) POLYTRIMETHYLENE TEREPHTHALATE COMPOSITION PARTICLES AND PROCESS FOR PRODUCING SAME

(75) Inventors: Jinichiro Kato, Nobeoka (JP); Satoru Yoshida, Nobeoka (JP); Teruhiko Matsuo, Nobeoka (JP)

(73) Assignee: Asahi Kasei Fibers Corporation, Osaka-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/507,840

(22) PCT Filed: Mar. 14, 2003

(86) PCT No.: PCT/JP03/03118

§ 371 (c)(1), (2), (4) Date: Sep. 15, 2004

(87) PCT Pub. No.: WO03/078501

PCT Pub. Date: Sep. 25, 2003

(65) Prior Publication Data

US 2005/0104030 A1 May 19, 2005

(30) Foreign Application Priority Data

Mar. 18, 2002 (JP) .............................. 2002-073508

(51) Int. Cl.
*C08G 63/00* (2006.01)
*C08G 63/80* (2006.01)
*C08G 63/183* (2006.01)
*C02F 5/10* (2006.01)

(52) U.S. Cl. ...................... 528/272; 528/288; 528/481; 528/502; 528/503; 526/65; 428/357; 428/364

(58) Field of Classification Search ................ 528/272, 528/288, 481, 502, 503; 526/65; 428/357, 428/364; 252/180

See application file for complete search history.

(56) References Cited

U.S. PATENT DOCUMENTS 5,990,265 A * 11/1999 Blanchard et al. .......... 528/272
6,740,402 B2 * 5/2004 Tsukamoto .................. 428/364

FOREIGN PATENT DOCUMENTS

| EP | 1 016 741 A1 | 7/2000 |
| EP | 1 046 622 A | 10/2000 |

* cited by examiner

*Primary Examiner*—Duc Truong
(74) *Attorney, Agent, or Firm*—Finnegan, Henderson, Farabow, Garrett & Dunner, L.L.P.

(57) ABSTRACT

Poly(trimethylene terephthalate) composition particles comprising 80% by weight or more of trimethylene terephthalate units based on the entire repeating units, having an intrinsic viscosity from 0.8 to 2 dl/g, and satisfying the following conditions (a) to (c): (a) the composition particles have a particle size of 3 mm or less and a weight of less than 1 mg/particle; (b) the composition particles have a terminal carboxyl group content of 25 meq/kg or less; and (c) the composition particles have a cyclic dimer content of 1.5% by weight or less.

7 Claims, No Drawings

POLYTRIMETHYLENE TEREPHTHALATE COMPOSITION PARTICLES AND PROCESS FOR PRODUCING SAME

TECHNICAL FIELDS

The present invention relates to poly(trimethylene terephthalate) composition particles and a process for producing the same.

BACKGROUND ART

A poly(trimethylene terephthalate) (hereinafter abbreviated to PTT) is a polycondensation product of terephthalic acid and/or a lower alcohol ester of terephthalic acid with 1,3-propane diol (also termed trimethylene glycol, hereinafter abbreviated to PDO).

PTT fibers obtained by melt spinning a PTT have many excellent properties such as an astonishingly soft feeling, drapability, excellent stretchability, low temperature dye-affinity and weathering resistance. Conventional synthetic fibers such as conventional poly(ethylene terephthalate) (hereinafter abbreviated to PET) fibers and nylon 6 fibers have no such excellent properties.

A process comprising once pelletizing a prepolymer of a PTT obtained by melt polymerization, and heating the prepolymer in a pellet form without remelting the pellets to effect polymerization, namely, a production process of a PTT in which melt polymerization is combined with solid-state polymerization, has been known as a production process of a PTT.

Elementary reactions forming the polycondensation reactions of a PTT mainly include the following two types of reactions: the forward reaction of a chain growth reaction (the following formula (a1)) in which PDO is removed from two terminal hydroxyl groups; the backward reaction including a reaction (the following formula (a2), namely the reverse reaction of the formula (a1)) in which an ester portion is decomposed with undischarged PDO and a thermal decomposition reaction (the following formula (b)).

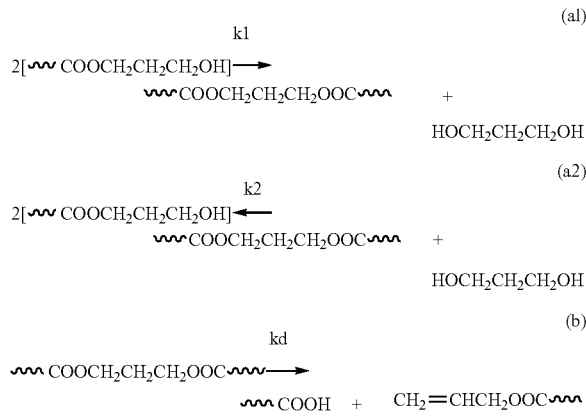

A PTT is more likely to suffer a thermal decomposition reaction than a PET and a poly(butylene terephthalate) (hereinafter abbreviated to PBT), each having a skeleton similar to that of a PTT. That is, kd in the above formula (b) is large. As a result, it is difficult to adequately increase the molecular weight of a PTT by melt polymerization alone. A process wherein solid-state polymerization (in which polymerization is carried out at temperature as low as up to the melting point) is carried out in combination is usually employed after melt polymerization.

However, various problems caused by the properties of the polymer arise in the production of a PTT.

A first problem is that a PTT tends to be thermally decomposed in a melt polymerization step. Because kd is large in the above formula (b), lowering of the molecular weight of a PTT is likely to take place at high temperature. Furthermore, carboxyl groups and allyl groups produced by thermal decomposition accelerate further thermal decomposition, which causes lowering of the whiteness and oxidation resistance stability of the polymer.

Inhibiting the thermal decomposition as much as possible therefore becomes an essential requirement for obtaining a PTT of high quality in the melt polymerization step of a PTT. However, known technologies are still insufficient to satisfy the requirement. Such thermal decomposition does not matter substantially in the production of a PET and a PBT. For a PET or a PBT, the thermal decomposition rate constant corresponding to kd is far smaller in comparison with a PTT, and the thermal decomposition hardly takes place. As a result, polymers of high quality can be produced by melt polymerization alone, and polymers each having a sufficiently high molecular weight can be obtained without a combination with solid-state polymerization. Accordingly, the first problem is one extremely specific to a PTT, and solution of the problem is difficult even when known information about a PET and a PBT is used.

A second problem is as follows: although solid-state polymerization inhibits the thermal decomposition and a PTT having a high molecular weight can be obtained, the polymerization rate sometimes becomes significantly low due to low polymerization temperature. It takes a significantly long time for known technologies to subject a PTT to solid-state polymerization, though the time differs depending on the molecular weight of a prepolymer and the molecular weight to be attained. A decrease in the productivity is therefore unavoidable. Moreover, although the polymerization temperature is low, thermal decomposition of a polymer is unavoidable to a certain degree when the solid-state polymerization is carried out at temperature close to 200° C. for a long period of time.

A third problem is as explained below. A PTT in a state of pellets tends to be cracked, and powdery material is likely to be produced when PTT pellets rub together during transportation, drying, solid-state polymerization, and the like of the PTT. Moreover, a cyclic oligomer formed during melt polymerization is contained in the PTT in a large amount. When PTT pellets and the powdery material are in a mixture, yarn breakage and fluff formation are likely to take place in the melt-molding step. Furthermore, because a cyclic oligomer is highly volatile, it is deposited around the spinning nozzle during the melt spinning step, and the deposits also cause yarn breakage and fluff formation.

The crack formation, generation of powdery material and deposition of a cyclic oligomer are problems specific to a PTT. A PET and a PBT each having a structure similar to a PTT substantially have no such problems.

When a PTT is produced by melt polymerization alone, the content of a cyclic oligomer in the PTT amounts to 1.6 to 3.5% by weight. In contrast to the PTT, the oligomer content in a PET is about 1% by weight. Moreover, the oligomer of a PET is mostly cyclic trimer. However, the cyclic oligomer of a PTT is mostly cyclic dimer, and as a result the cyclic oligomer has a small molecular weight. The cyclic oligomer is therefore greatly volatile and soluble in water. Accordingly, the problems of the cyclic oligomer in the production process of a PTT are far more serious in comparison with those of a PET.

Several production processes in which melt polymerization and solid-state polymerization are employed in combination have been known. However, no process that solves the above problems simultaneously has hitherto been known.

For example, Japanese Unexamined Patent Publication (Kokai) No. 8-311177 describes that when PTT pellets are subjected to solid-state polymerization at temperature close to 200° C. for a few hours in vacuum, the oligomer content amounts to 1% by weight or less. However, the above problems except for the problem of the oligomer are not recognized in the patent publication, and thus the patent publication does not describe methods of solving the problems.

In the specification of U.S. Pat. No. 2001/0056172 A1, a process for solid-state polymerizing PTT pellets in an amount from 10 to 15 mg is described. However, generation of powdery material and the problem of a cyclic oligomer are not recognized at all in the patent publication, and thus no suggestion related to methods for solving the problems is described therein.

Japanese Unexamined Patent Publication (Kokai) No. 2000-159875 discloses a process for obtaining a PTT of high grade by solid-state polymerizing a polymer obtained by melt polycondensing with a catalyst mixture of Ti and Mg in a specific state and having a low terminal vinyl group content, under reduced pressure or in an inert gas atmosphere. However, because Mg is used as a catalyst in the process, the PTT has a dull color tone, and the L* value is as low as about 60 to 70; the pellets have a poor color tone. Moreover, no suggestion about recognition of the above problems or a method for solving the problems is described therein.

The pamphlet of International Patent WO 97/23543 describes a process comprising dropping a molten PTT having a low polymerization degree on a hot plate without pelletizing, crystallizing the PTT at temperature from 60 to 190° C. to form a PTT in a solid state having an apparent fine crystal size of 18 nm or more, and then solid-state polymerizing the PTT. However, the TTT obtained by the process has a drastically uneven surface, and easily produces powdery material when rubbed together. The PTT is therefore estimated to have poor moldability. Moreover, the pamphlet includes no description about the color tone and improvement of the oxidation resistance stability, and neither describes nor suggests recognition of the problems about the moldability, crack formation and powdery material of PTT or solution methods of the problems.

The pamphlet of International Patent WO 98/23662 describes in Example 8 a process comprising pelletizing a PTT the terminals of which are sealed with a hindered phenol stabilizer, and solid-state polymerizing the pelletized PTT. The pamphlet of International Patent WO 99/11709 describes in Example 8 a process comprising pelletizing a PTT containing a phosphorus type stabilizer, and solid-state polymerizing the pelletized PTT. However, both pamphlets neither describe nor suggest recognition of the problems about the moldability, crack formation and powdery material of the PTT or solution of the problems.

DISCLOSURE OF THE INVENTION

The present inventors have carried out intensive investigations in order to solve such problems specific to a PTT as explained above, namely, a problem about lowering of whiteness of a PTT caused by the thermal decomposition, a problem about the oxidation resistance stability, a problem about low productivity of a PTT during the solid-state polymerization step and a problem about lowering of the moldability caused by the powdery material and cyclic dimer. As a result, the present inventors have found that a PTT can be polymerized even at low temperature at a markedly high solid-state polymerization rate by rather actively utilizing the phenomenon that a PTT, which differs from a PET and a PBT, can be unusually easily powderized, and the cyclic dimer content in the PTT can be decreased in comparison with PTT pellets, and that fluff formation and yarn breakage are made to hardly take place in a melt molding step of a PTT that is not in pellets but in powder alone having a specific particle size.

Furthermore, the present inventors have also found that because a PTT is not required to be polymerized to a high degree (high viscosity) in the melt-polycondensation step, the melt-polycondensation reaction can be carried out in a short period of time, and that a PTT having a high molecular weight and having less suffered thermal decomposition to a minimum degree can be obtained even when the solid-state polymerization is carried out at lower temperature.

A problem to be solved by the present invention is to provide PTT composition particles excellent in whiteness and oxidation resistance stability, showing yarn breakage and fluff formation to a decreased degree, and excellent in moldability. Specifically, an object of the present invention is to provide a process that comprises granulating a reaction product obtained by melt-polycondensing a PTT, and subjecting the granulated material to solid-state polymerization to give a PTT of high quality having less suffered thermal decomposition, with high productivity.

That is, the present invention is as explained below.

1. PTT composition particles comprising 80% by weight or more of trimethylene terephthalate units based on the entire repeating units, having an intrinsic viscosity from 0.8 to 2 dl/g, and satisfying the following conditions (a) to (c):
 (a) the composition particles have a particle size of 3 mm or less and a weight of less than 1 mg/particle;
 (b) the composition particles have a terminal carboxyl group content of 25 meq/kg or less; and
 (c) the composition particles have a cyclic dimer content of 1.5% by weight or less.

2. The PTT composition particles according to 1 mentioned above, wherein the PTT composition particles have a cyclic dimer content of 2% by weight or less after maintaining the particles in a molten state at 260° C. for 30 minutes.

3. The PTT composition particles according to 1 or 2 mentioned above, wherein 95% or more of the particles pass through a 10-mesh filter, and 5% or less of the particles pass through a 500-mesh filter.

4. PTT composition particles suited to solid-state polymerization, comprising 80% by weight or more of trimethylene terephthalate units based on the entire repeating units, having an intrinsic viscosity from 0.1 to 0.79 dl/g, and satisfying the following conditions (a) to (c):
 (a) the composition particles have a particle size of 3 mm or less and a weight of less than 1 mg/particle;
 (b) the composition particles have a terminal carboxyl group content of 35 meq/kg or less; and
 (c) the composition particles have a cyclic dimer content from 1.6 to 3.5% by weight.

5. The PTT composition particles suited to solid-state polymerization according to 4 mentioned above, wherein 95% or more of the particles pass through a 10-mesh filter, and 5% or less of the particles pass through a 500-mesh filter.

6. A process for producing PTT composition particles comprising the following steps (1) to (3):

(1) a step of reacting terephthalic acid and/or a lower alcohol ester derivative of terephthalic acid with 1,3-propanediol to form 1,3-propanediol ester of terephthalic acid and/or a polymer thereof;

(2) a step of granulating 1,3-propanediol ester of terephthalic acid and/or a polymer thereof obtained in the step (1); and (3) a step of heating granulated 1,3-propnanediol ester of terephthalic acid and/or a polymer thereof in a solid-state, whereby the intrinsic viscosity is increased by 0.1 dl/g or more.

7. The process for producing PTT composition particles according to 6 mentioned above, wherein the method of granulating 1,3-propanediol ester of terephthalic acid and/or a polymer thereof is at least one of the following methods (1) to (3):

(1) a method comprising extruding the ester and/or the polymer in a molten state, and then cutting the extruded material;

(2) a method comprising atomizing the ester and/or the polymer in foggy state, and then finely granulating the atomized material; and (3) a method comprising solidifying the ester and/or the polymer, and then crushing the solidified material.

8. The process for producing PTT composition particles according to 6 or 7 mentioned above, wherein the particle size is 3 mm or less, and the particle weight is less than 1 mg/particle.

9. The process for producing PTT composition particles according to 7 mentioned above, wherein 95% or more of the particles pass through a 10-mesh filter, and 5% or less of the particles pass through a 500-mesh filter.

10. The process for producing PTT composition particles according to any one of 6 to 9 mentioned above, wherein the composition particles have a terminal carboxyl group content originating from the polymer of 1,3-propanediol ester of terephthalic acid of 35 meq/kg or less.

11. A process for producing PTT composition particles comprising heating the PTT composition particles according to 3 or 4 mentioned above in a solid-state to increase the intrinsic viscosity by 0.1 dl/g or more.

12. The process for producing PTT composition particles according to any one of 6 to 11 mentioned above, wherein the PTT composition particles are heated in a solid-state to increase the intrinsic viscosity by 0.1 dl/g or more, and part of or the entire of the polycondensation activity remaining in the catalyst is deactivated.

13. The process for producing PTT composition particles according to 12 mentioned above, wherein the method of deactivating part of or the entire of the polycondensation activity of the catalyst is a method comprising contacting the particles with a polar compound having a temperature of 50° C. or above.

14. A process for producing PTT composition particles comprising contacting the PTT composition particles according to any one of 1 to 3 mentioned above with a polar compound having a temperature of 50° C. or above.

15. The process for producing PTT composition particles according to 13 or 14 mentioned above, wherein the polar compound is at least one substance selected from the group consisting of water, methanol, phosphoric acid, hydrogen chloride, sulfuric acid and ammonia.

16. A molded article prepared by molding the PTT composition particles according to any one of 1 to 3 mentioned above.

17. A fiber prepared by molding the PTT composition particles according to any one of 1 to 3 mentioned above.

18. A tire cord prepared by molding PTT composition particles comprising 80% by weight or more of trimethylene terephthalate units based on the entire repeating units, and having an intrinsic viscosity from 0.8 to 2 dl/g.

19. A tire for which a tire cord according to 18 mentioned above is used.

The present invention is explained below in detail.

A PTT forming the PTT composition particles of the present invention is a polymer comprising 80% by weight or more of trimethylene terephthalate units based on the entire repeating units. The PTT may therefore be copolymerized with a comonomer other than terephthalic acid and PDO in an amount of 20% by weight or less, preferably 10% by weight or less based on the entire repeating units.

Examples of the comonomer include oxalic acid, succinic acid, adipic acid, sebacic acid, dodecanoic acid, dodecanoic diacid, cyclohexanedicarboxylic acid, 5-sodiumsulfoisophthalic acid, ethylene glycol, butanediol, hexanediol, cyclohexanediol, cyclohexanedimethanol, trimethylene glycol dimer and a polyalkylene glycol having an average molecular weight from 400 to 20,000. These compounds may be used singly, or at least two of them may be used in combination.

The PTT composition particles of the present invention may optionally contain various additives such as delustering agents, thermal stabilizers, defoaming agents, color modifying agents, flame retardants, antioxidants, UV-ray absorbers, IR-ray absorbers, crystallization nucleating agents and fluorescent brighteners. These additives may be copolycondensed or mixed. Titanium oxide is preferred as the delustering agent, and the content is preferably from 0.01 to 3% by weight based on the PTT composition particles.

Furthermore, in order to inhibit thermal decomposition during the polymerization step, a thermal stabilizer is preferably used. Examples of the thermal stabilizer include phosphorus compounds such as phosphoric acid, trimethyl phosphate and triethyl phosphate. A thermal stabilizer, for example, a phosphorus compound is used in a content of preferably from 2 to 250 ppm, and more preferably from 10 to 100 ppm as phosphorus based on the PTT composition particles. A hindered phenol type antioxidant may also be used as the thermal stabilizer in an amount of 0.01 to 1% by weight based on the PTT composition particles.

When the PTT composition particles are colored, a color modifying agent such as cobalt acetate, cobalt formate and a fluorescent brightener may also be added in an amount from 0.0001 to 0.05% by weight based on the PTT composition particles.

The intrinsic viscosity of the PTT composition particles of the present invention is from 0.8 to 2 dl/g, preferably from 0.8 to 1.5 dl/g.

When the intrinsic viscosity is less than 0.8 dl/g, the polymerization degree becomes low. As a result, the strength and durability of the molded article after melt molding decrease. Moreover, when the intrinsic viscosity exceeds 2 dl/g, the melt viscosity becomes excessively high, and the melt spinning becomes difficult.

In view of the solid-state polymerization rate and moldability, the particle size of the PTT composition particles of the invention is 3 mm or less, and the particle weight is less than 1 mg/particle.

When the particle size exceeds 3 mm, the solid-state polymerization rate becomes slow, and powder is generated during drying, transportation, solid-state polymerization, or the like, to cause lowering of the moldability. Although there is no specific limitation on the lower limit of the particle size, the lower limit is about 0.01 μm that is a minimum value attainable by conventional powderizing technologies.

In view of the easiness of granulation and post-treatment of the PTT composition particles with polar material, the particle size is preferably from 2.7 mm to 1 μm, and most preferably from 2 mm to 25 μm.

In addition, the size of a PTT composition particle designates the longest portion of the particle. For example, when the particle is approximately circular, the particle size designates the diameter, and when the particle is approximately elliptical, the particle size designates the major axis.

Furthermore, the PTT composition particles of the invention are preferably particles 95% or more of which pass through 10-mesh filter, and 5% or less of which pass through a 500-mesh filter. The particles particularly preferably pass through a 10-mesh filter in an amount of 97% or more, and a 500-mesh filter in an amount of 3% or less. When amounts of particles that pass through the above filters are in the above ranges, PTT composition particles having uniform quality with respect to a polymerization degree, whiteness, a cyclic dimer content, and the like, are obtained. PTT composition particles being uniform, and having a uniform particle size and a fine particle shape show significant heat transfer effects, and can be dried in a short period of time and extruded at low temperature. The particles therefore show marked effects of inhibiting thermal deterioration, and the like.

In view of the moldability, the weight of PTT composition particles is less than 1 mg/particle, preferably 0.5 mg/particle or less, and more preferably 0.3 mg/particle or less. When the particles have an excessively small weight, they are likely to aggregate. The lower limit of the weight is preferably 0.0001 mg/particle or more from the standpoint of inhibiting the aggregation.

The PTT composition particles of the invention have a content of carboxyl groups situated at the PTT molecular ends of 25 meq or less per kg of the PTT composition particles, preferably 15 meq/kg or less, and more preferably 12 meq/kg or less. When the terminal carboxyl group content exceeds 25 meq/kg, the particles are colored during heating, and the oxidation resistance stability is lowered.

The PTT composition particles of the present invention have a cyclic dimer content of 1.5% by weight or less based on the weight of the PTT composition particles, preferably 1.3% by weight or less, and more preferably 1% by weight or less. When the cyclic dimer content is in the above range, cyclic dimer causes no problem during the spinning and processing steps. In addition, a smaller content of cyclic dimer is preferred, and a cyclic dimer content of zero is most preferred.

Cyclic dimer is a substance having a structure of the formula (1):

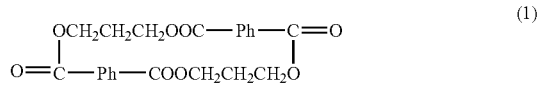

(1)

wherein Ph is a benzene ring originating from terephthalic acid.

The PTT composition particles of the invention having been maintained in a molten state at 260° C. for 30 minutes has a cyclic dimer content of preferably 2% by weight or less, more preferably 1.8% by weight or less, still more preferably 1.5% by weight or less, and particularly preferably 1.1% by weight or less. When PTT resin composition particles having a cyclic dimer content of 2% by weight or less are remelted and the molten material is subjected to melt molding such as melt spinning, melt filming, injection molding, extrusion molding or blow molding, an increase in the amount of cyclic dimer can be markedly decreased. In addition, there is no specific limitation to the lower limit of the cyclic dimer content. A smaller cyclic dimer content is preferred, and a cyclic dimer content of zero is most preferred.

The PTT composition particles of the present invention preferably show an L* value of 75 or more, and a b* value from −2 to 5.

When the PTT composition particles showing an L* value of 75 or more, or a b* value or 5 or less are colored with, for example, a dye or a pigment, the products obtained therefrom are excellent in color tone and brightness. In order to obtain more excellent color development and brightness of the products, the L* value is preferably 80 or more, and more preferably 85 or more, and the b* value is preferably from −1 to 5, and more preferably from −1 to 4.

In addition, the L* value and the b* value are indexes of color tone represented by the CIE-L*a*b* (CIE 1976) color system. The L* value represents brightness. A larger L* value signifies that the color tone is brighter. The b* value represents yellowness, and a larger b* value signifies that the yellowness becomes stronger.

One preferred example of a process for producing PTT composition particles of the invention is explained below.

The PTT composition particles of the invention are produced by the following steps: (1) a condensation step of reacting terephthalic acid and/or a lower alcohol ester of terephthalic acid with PDO to form bis(3-hydroxypropyl) terephthalate and/or a polymer thereof; (2) a step of granulating bis(3-hydroxypropyl)terephthalate and/or a polymer thereof thus obtained; and (3) a step of subjecting the particles thus obtained to solid-state polymerization.

A polymer of bis(3-hydroxypropyl)terephthalate herein is a polymer in which trimethylene terephthalate units are connected. The polymerization degree is preferably 2 or more, and more preferably from 3 to 100. Hydroxyl groups, carboxyl groups, allyl groups, and the like may be present at the molecular ends.

First, the polycondensation step (1) is explained below.

For polymerization starting materials, the charging ratio of PDO to terephthalic acid and/or a lower alcohol ester of terephthalic acid is preferably from 1 to 3 in terms of a molecular ratio, more preferably from 1.4 to 2.5, and still more preferably from 1.5 to 2.3. When the charging ratio is in the above range, the esterification reaction proceeds smoothly, and a polymer having a high melting point and excellent in whiteness is obtained.

Furthermore, a lower alcohol ester of terephthalic acid is preferred as a starting material because the PTT composition particles thus obtained have a good color tone.

In order to make the reaction proceed smoothly, use of a catalyst is preferred. Examples of the catalyst include titanium alkoxides such as titanium tetrabutoxide and titanium tetraisopropoxide, metal oxides such as amorphous titanium oxide precipitates, amorphous titanium oxide/silica coprecipitates and amorphous zirconia precipitates, metal carboxylates such as calcium acetate, manganese acetate, cobalt acetate and antimony acetate and germanium compounds such as germanium dioxide. Use of the catalyst in an amount from 0.01 to 0.2% by weight based on the entire carboxylic acid component monomer is preferred in view of the reaction rate and the polymer whiteness.

The reaction temperature is preferably from about 200 to 250° C. The reaction can be carried out while by-produced water and an alcohol such as methanol are being distilled off. The reaction time is usually from 2 to 10 hours, and preferably from 2 to 4 hours.

The reaction products thus obtained are bis(3-hydroxypropyl)terephthalate and/or an oligomer thereof. The polycondensation reaction may also be made to proceed further in a molten state.

An object of the polycondensation reaction is to make the polymer have such a molecular weight that the polymer is solid at solid-state polymerization temperature from 190 to 225° C. That is, the object is to make the polymer have a melting point higher than 190° C. It is not necessary to drastically increase the molecular weight.

In the polycondensation reaction, the following materials may optionally be added further: titanium alkoxides such as titanium tetrabutoxide and titanium tetraisopropoxide, metal oxides such as amorphous titanium oxide precipitates, amorphous titanium oxide/silica coprecipitates and amorphous zirconia precipitates, and germanium compounds such as germanium dioxide. The materials may be added in an amount from 0.01 to 0.2% by weight based on the entire carboxylic acid component monomers, and the polycondensation may be carried out according to a known method.

The polycondensation reaction is carried out at temperature preferably from 240 to 270° C. and more preferably from 250 to 265° C., at a vacuum degree preferably from 0.0001 to 1 kPa for an optimum polymerization time that is usually 3 hours or less, and preferably from 0.3 to 2 hours, while the terminal carboxylic acid content of the reaction product is being evaluated; the reaction is carried out so that the terminal carboxylic acid content becomes 35 meq/kg or less.

Furthermore, in order to efficiently distill PDO off during the polycondensation reaction, it is important to increase the surface area of the polymer. In order to increase the surface area, for example, a helical stirring apparatus, a disc ring reactor, or the like is employed, and efficient stirring is conducted so that the reaction product is raked up to form a film. At the same time, the charging ratio of the starting material based on the volume of the polycondensation reactor is set at preferably 40% or less, more preferably 35% or less.

Furthermore, it is preferred to stop the polycondensation reaction while the viscosity of the molten material in the polycondensation reaction step is increasing with time. It is important to finish the polycondensation reaction before the viscosity thereof stops to increase with time or rather decreases, for the following reasons. When the viscosity does not increase with time or rather decreases, the thermal decomposition reaction becomes predominant over the polycondensation reaction, and the content of terminal carboxylic acid formed by thermal decomposition increases.

In addition, phosphorus compounds mentioned above, hindered phenol antioxidants and color modifying agents can be added at an optional step of the polycondensation reaction, preferably prior thereto.

The intrinsic viscosity of the reaction product obtained through the polycondensation reaction is usually from 0.1 to 0.79 dl/g; it is preferably from 0.1 to 0.5 dl/g in order to inhibit thermal decomposition. Moreover, the resultant polymer contains cyclic dimer usually in an amount from 1.6 to 3.5% by weight.

When the polycondensation step is completed, the granulating step (2) is subsequently carried out.

There is no specific limitation on the method for granulating 1,3-propanediol ester of terephthalic acid (namely, bis(3-hydroxypropyl)terephthalate) and/or a polymer thereof taken out of the polycondensation reactor. However, examples of the method include the following ones: a method comprising extruding the ester and/or a polymer thereof in a molten state, preferably cooling the extruded material to be solidified, and finely cutting the extruded material; a method comprising atomizing the ester and/or a polymer thereof in a foggy state, and cooling the atomized material to form fine particles; and a method comprising solidifying the ester and/or a polymer thereof, and crushing the solidified material.

Known methods for crushing can be employed. Apparatuses such as a Henschel mixer, a ball mill and a crusher can be used for crushing. The particle size and the particle weight of the particles thus obtained are as described above.

The prepolymer composition thus obtained in a particle form is subjected to solid-state polymerization (3) to give the PTT composition particles of the present invention.

Next, a method for producing PTT composition particles of the present invention from the prepolymer composition in a particle form is explained below.

In addition, solid-state polymerization herein signifies to increase an intrinsic viscosity of the prepolymer composition by 0.1 dl/g or more by heating the composition in a solid state.

Prior to solid-state polymerization, the prepolymer composition is preferably crystallized by heat treating the composition at temperature of the melting point or below. The crystallization can suppress variation in the extraction rate caused by melt sticking of particles during the solid-state polymerization.

When the polycondensation is conducted, the crystallization is carried out under the following heat treatment conditions: preferably in an inert gas atmosphere at temperature that the particles attain from 190 to 225° C. preferably for a time from 5 to 120 minutes. When the temperature is in the above range, crystallization proceeds sufficiently to produce no nonuniform crystal formation. As a result, no melt sticking of the particles takes place during the solid-state polymerization.

In addition, when nonuniform polymerization is produced in the prepolymer by drastic heat treatment of the prepolymer, heat treatment of the prepolymer at temperature from 80 to 180° C. for 5 to 120 minutes prior to the crystallization heat treatment is preferred.

Furthermore, when the polycondensation step is omitted, a method of gradually heating the prepolymer to temperature from 100 to 200° C. is preferred as crystallization heat treatment, because melt sticking and melting of the prepolymer is avoided. In the crystallization stage, increasing the molecular weight and discharging by-products such as PDO may also be conducted.

In order to inhibit coloring of a PTT in the solid-state polymerization, and increase the solid-state polymerization rate, the solid-state polymerization temperature is preferably from 170 to 225° C., more preferably from 190 to 215° C., and most preferably from 195 to 210° C. When the solid-state polymerization temperature is in the above range, the following advantages are obtained: a sufficient solid-state polymerization rate is obtained; no thermal decomposition of the PTT takes place; no PTT particles melt stick to the wall surface of the solid-state polymerizer; and the PTT is not highly polymerized, and a highly crystallized product is not formed. As a result, melt stability of the PTT is obtained during spinning and molding.

The solid-state polymerization is carried out in a vacuum atmosphere or under an inert gas stream. Both procedures are effective in efficiently discharging polymerization by-products such as water and PDO from the particle surfaces; it is important to carry out the solid-state polymerization under specific polymerization conditions.

When solid-state polymerization is carried out in a vacuum atmosphere, the polymerization is carried out under pressure of preferably 30 kPa or less, more preferably 20 kPa or less, and most preferably from 0.001 to 10 kPa for the purpose of efficiently discharging polymerization by-products.

Procedures of carrying out solid-state polymerization under an inert gas stream are explained below.

The inert gas herein designates a gas that does not react with a PTT substantially at solid-state polymerization temperature. Examples of the inert gas include nitrogen, argon and neon. Use of nitrogen gas is preferred in view of cost. When the inert gas contains oxygen, thermal decomposition of the PTT is promoted during solid-state polymerization, and the PTT is colored. The oxygen content is therefore preferably 100 ppm or less based on the inert gas.

The solid-state polymerization is carried out while inert gas is allowed to flow into a solid-state polymerizer in which granular PTT has been placed. A superficial velocity that is a flow rate of the inert gas at the time is preferably 2 cm/min or more in view of the solid-state polymerization rate. Although there is no specific limitation on the upper limit of the superficial velocity, the upper limit is preferably 400 cm/min to avoid wasting the inert gas because the efficiency of discharging polymerization by-products is not further improved when the superficial velocity exceeds 400 cm/min.

In addition, the superficial velocity is a value obtained by dividing a gas flow rate ($cm^3$/min) by a cross-sectional area ($cm^2$) of the solid-state polymerizer through which the gas passes.

Examples of the method for allowing inert gas to flow include a method comprising continuously feeding a granular prepolymer composition at a constant rate to one side of a solid-state polymerizer, allowing an inert gas to flow in the direction reverse to the flow of the granular prepolymer composition, and continuously extracting the resultant product at a rate equal to the feeding rate of the granular prepolymer composition from the other side thereof, and a method comprising placing the granular prepolymer composition in a solid-state polymerizer, preferably with the contents stirred, and allowing an inert gas to flow at a superficial velocity as mentioned above.

A solid-state polymerizer is satisfactory as long as granular prepolymer composition can be heated from the inner wall thereof. For example, the following polymerizer is preferred: a banker type polymerizer wherein an inlet of a granular prepolymer composition is provided to the upper portion of a cylindrical tube, a conical outlet is provided at the lower portion thereof, and heat is provided to the polymerizer from the outside with a heating medium or steam.

The residence time of a granular prepolymer composition within the solid-state polymerizer is preferably from 0.5 to 20 hours, and more preferably from 0.5 to 10 hours. Continuous solid-state polymerization is preferred due to the high productivity compared with that of batch type solid-state polymerization in which the PTT is processed batchwise.

In order to carry out discharging PDO efficiently in the solid-state polymerization, it is preferred to efficiently stir or fluidize the granular prepolymer composition.

The solid-state polymerization as explained above makes the PTT have a high molecular weight and a decreased cyclic dimer content.

Moreover, although the PTT composition particles thus obtained are excellent in whiteness, oxidation resistance stability and moldability, they are preferably treated with a polar compound. When a catalyst is used in the polycondensation step, the PTT composition particles subsequent to solid-state polymerization contain a catalyst for polycondensing a polymer of 1,3-propanediol ester of terephthalic acid. Part of or the entire polycondensation activity of the catalyst can be deactivated by treating the particles with a polar compound. Deactivation of the catalyst inhibits an increase in cyclic dimer during melting in the molding step, and more preferable PTT composition particles having excellent light resistance are obtained.

Because the PTT composition particles in the present invention have a large specific surface area, the above treatment of the particles with a polar compound can be carried out efficiently in comparison with treatment of pellets.

Although there is no specific limitation on the procedure for contacting the PTT composition particles with a polar compound, the treatment with a polar compound is satisfactory as long as partial or complete deactivation of the catalyst is observed when the treatment is carried out. Examples of the procedure include a procedure in which the PTT composition particles are placed in a polar compound atmosphere, and a procedure in which a polar compound is injected or placed in the PTT composition particles that are in a molten state, a solid state, a solution state or a dispersed state.

The temperature at which the PTT composition particles are treated with a polar compound is preferably 50° C. or above, more preferably 70° C. or above, still more preferably 150° C. or above, and most preferably from 180 to 220° C.

During the treatment, the polar compound may be a liquid, a gas or a fluid that is at a critical point or above.

Although there is no specific restriction on the treatment time, solvolysis of the PTT takes place more, and the molecular weight lowers more when the treatment time increases. It is therefore preferred to treat the PTT in as short a period of time as possible. The treatment time is preferably 60 minutes or less usually, more preferably 30 minutes or less, and still more preferably 10 minutes or less.

The polar compound is a compound having a heteroatom such as oxygen, nitrogen, phosphorus and sulfur, and more preferably is a compound capable of forming a hydrogen bond. Specific examples of such a compound include water, alcohols such as methanol, ethanol, propanol, PDO, 1,4-butanediol, ethylene glycol, glycerin and ethanolamine, phosphorus compounds such as trimethyl phosphate, triethyl phosphate, tributyl phosphate, triphenyl phosphate, trimethyl phosphite, triethyl phosphite, triphenyl phosphite, phosphoric acid and phosphorous acid, acids such as formic acid, acetic acid, propionic acid, hydrogen chloride and sulfuric acid, and amines such as ammonia, methylamine, dimethylamine, ethylenediamine, triethylamine, ethyleneimine and amine. Of these compounds, water, methanol, phosphoric acid, hydrogen chloride, sulfuric acid and ammonia are preferred, and water is particularly preferred because water is easy to handling and has nontoxic properties.

There is no specific restriction on the ratio of a polar compound to PTT composition particles of the invention when both materials are contacted with each other. A weight ratio from 100,000/1 to 0.01/1 is usually satisfactory.

Because the PTT composition particles of the invention thus obtained are excellent in whiteness, oxidation resistance stability and moldability, the particles can be processed to give molded material such as fibers, films and molded articles by known procedures such as melt molding and wet molding.

Because the fibers are particularly excellent in a soft feeling, fatigue resistance and elastic recovery, the fibers are useful for clothing and industrial material applications. Examples of the form of the fibers include multifilaments, a monofilament, staple fibers and nonwoven fabrics. The single filament size may be from 0.0001 to 30,000 dtex, and the total filament size may be from 5 to 30,000 dtex. Moreover, the intrinsic viscosity is preferably from 0.8 to 2 dl/g in view of the fatigue resistance. The strength is preferably 3 cN/dtex or more, and more preferably 4 cN/dtex or more. The elongation is preferably from 10 to 50%.

Examples of an appropriate application of the fibers include an application of the fibers to reinforcing materials for tires, belts, hoses, and the like, wherein the fibers are used as a twisted yarn product (twisted yarn cord). In particular, the fibers are extremely useful as tire cords for bias tires in which the excellent oxidation stability resistance and fatigue resistance are utilized. There is no specific limitation on the type of a twisted yarn, the method of twisting and the number of doubled and twisted yarns. Examples of the types of twisted yarns include a single twist yarn, a plied yarn, a plied yarn of different nature of strand and a hard twisted yarn. There is no specific restriction on the number of doubled and twisted yarns. Examples of the twisted yarns include one twisted yarn, two twisted yarns, three twisted yarns, four twisted yarns and five twisted yarns. At least six doubled and twisted yarns may also be used. Yarns other than the PTT yarns such as nylon yarns, PET yarns, aramid yarns or rayon can be used in combination with PTT yarns for the doubled and twisted yarns.

There is no specific limitation on the number of twist, and the number can be suitably selected while the single filament size and the total size are taken into consideration. The number of twist may be optionally selected in accordance with texturing conditions and the environment in which the fibers are used. For example, for a twisted yarn cord formed out of multifilaments having a single filament size from 0.01 to 10 dtex, and a total size from 30 to 100,000 dtex, a twisted yarn cord having a twist factor K (T/m·dtex$^{0.5}$) represented by the following formula of 1,000 to 30,000 is preferred in view of the fatigue resistance and the manifestation of the strength:

$$K = Y \times D^{0.5}$$

wherein Y is a number of twist (T/m) per meter of the twisted yarn cord, and D is a total size (dtex) of the twisted yarn cord. The total size herein is a sum of the size of the entire yarns used for the twisted yarns. For example, when three yarns each having a size of 1,660 dtex are twisted, the total nominal size of the twisted yarn product becomes 4,980 dtex (1,660×3). When a plurality of yarns are twisted and subjected to multiple twist such as first twist and second twist, the number of twist to which the yarns are finally subjected is defined as a twist number Y, and the twist factor is calculated.

A solution containing 10 to 30% by weight of resorcin-formalin-latex (hereinafter abbreviated to RFL) is allowed to adhere to such a twisted yarn cord, and the twisted yarn cord is heated to 100° C. or above, whereby the twisted yarn cord is coated therewith. A treated cord excellent in thermal properties can thus be obtained. An amount of adhesion of the RFL resin is preferably from 2 to 7% by weight based on the yarn weight.

There is no specific limitation on the composition of an RFL solution. An RFL solution the composition of which has been known can be used without further processing or with modification. A preferred composition of an RFL solution is as follows: 0.1 to 10% by weight of resorcin, 0.1 to 10% by weight of formalin, and 1 to 28% by weight of latex. A more preferred composition thereof is as follows: 0.5 to 3% by weight of resorcin, 0.5 to 3% by weight of formalin, and 10 to 25% by weight of latex.

In the treatment with an RFL solution, the drying temperature is preferably from 120 to 250° C. and more preferably from 130 to 200° C., and the drying time is 10 sec or more, and preferably from 20 to 120 sec. Moreover, the RFL-coated cord subsequent to drying is then desirably subjected to constant-length heat treatment. For the heat treatment conditions, the heat treatment temperature is preferably the maximum thermal shrinkage temperature ±50° C., more preferably the maximum thermal shrinkage temperature ±10° C., and most preferably the maximum heat shrinkage temperature ±5° C. The heat treatment time is preferably from 10 to 300 sec, and more preferably from 30 to 120 sec. Moreover, during the heat treatment, the cord is desirably maintained at a constant length. The dimensional change subsequent to the heat treatment is preferably 3% or less, more preferably 1% or less, and most preferably 0%.

BEST MODE FOR CARRYING OUT THE INVENTION

The present invention will be further explained below by making reference to examples. However, needless to say, the present invention is in no way restricted thereto.

In addition, methods of measurements, methods of evaluation, and the like are as explained below.

(1) Intrinsic Viscosity

Using an Ostwald viscometer, the ratio ($\eta_{sp}/C$) of a specific viscosity $\eta_{sp}$ to a concentration C in terms of g/100 ml of a sample in o-chlorophenol at 35° C. is determined. The ratio ($\eta_{sp}/C$) is extrapolated to zero concentration. The intrinsic viscosity [η] is obtained from the following formula:

$$[\eta] = \lim(\eta_{sp}/C)$$
$$C \to 0$$

(2) Particle Size and Particle Weight

The length of the longest portion of each of freely optionally selected 50 PTT composition particles is measured with calipers and a microscope, and the average of the measured values is defined as the particle size.

Moreover, the average weight of optionally selected 50 PTT composition particles is determined, and defined as the particle weight.

(3) Amount of Particles that Pass through Filter

PTT composition particles in an amount of 50 g are allowed to pass through a 10-mesh (opening size of 1.70 mm as specified by JIS Z 8801). Moreover, the same procedure is conducted using a 500-mesh (opening size of 25 μm as specified by JIS Z 8801) filter. The amount (%) of the PTT composition particles that have passed through the 10-mesh filter and the amount (%) of the PTT composition particles that have passed through the 500-mesh filter are respectively determined.

(4) Terminal Carboxyl Group Content

PTT composition particles in an amount of 1 g are dissolved in 25 ml of benzyl alcohol, and 25 ml of chloroform is added to the solution. The solution is titrated with a 1/50 N solution of KOH in benzyl alcohol. The terminal carboxyl group content per kg of particles (meq/kg) is determined from the following formula:

$$\text{terminal carboxyl group content} = (VA - V0) \times 20 \quad (2)$$

wherein VA is a titrated amount (ml) thus obtained, and V0 is a titrated amount obtained without PTT composition particles (blank titration).

(5) Content of Cyclic Dimer

A sample in an amount of 0.3 g is dissolved in a mixture solution of 5 ml of chloroform and 5 ml of $(CF_3)_2CHOH$, and 5 ml of chloroform is further added, followed by adding about 80 ml of acetonitrile. The undissolved material then precipitated is separated by filtration, and all the filtrates are collected. Acetonitrile is added to the solution so that the resultant solution has a volume of 200 ml.

The solution is analyzed with high performance liquid chromatography to determine an amount of cyclic oligomer. The column used is μ Bond asphere C-18-100A column (size of 15 μm, 3.9 mm×150 mm) manufactured by Waters Corporation Inc. Water/acetonitrile (volume ratio of 30/70) is used as the mobile phase, and a UV-ray having a wavelength of 242 nm is used as the detector. The analysis is carried out at 45° C. at a flow rate of 1.5 ml/min.

(6) Color Tone (L*, b*)

A glass-made cell (an inside diameter of 61 mm and a depth of 30 mm) is filled with PTT composition particles to the depth from 90 to 100% of the depth of the cell. L* and b* in the CIE-L*a*b* (CIE 1976) color system of the sample are measured with a color difference meter (trade name of SM-7-CH, manufactured by SUGA TEST INSTRUMENTS CO., LTD.).

(7) Oxidation Resistance Stability

PTT composition particles are heated in the air at 220° C. for 24 hours, and the b* value is determined and used as an index of oxidation resistance stability.

(8) Melting Test of PTT Composition Particles at 260° C.

A sample in an amount of 1 g is placed in a glass ample, which is evacuated, and sealed therein by melting. The glass ample is placed in an oil bath at 260° C., and heated for 30 minutes. The glass ample is then taken out, and cooled. The sample is taken out, and the cyclic dimer content of the sample is determined.

EXAMPLE 1 TO 3

Dimethyl terephthalate in an amount of 1,300 g (6.7 moles), 1,144 g (15 moles) of PDO and 0.78 g of titanium butoxide were charged into a 3-liter autoclave equipped with plate-like blades. A transesterification reaction was carried out at 220° C. while methanol was being distilled off. The transesterification reaction ratio was 95%. After finishing the transesterification reaction, 0.52 g of titanium tetrabutoxide as a catalyst and 0.65 g of trimethyl phosphate as a thermal stabilizer were added to the reaction mixture, and the contents were stirred for 30 minutes. A polycondensation reaction was carried out for 2 hours at 260° C. at a vacuum degree of 20 Pa while PDO was being distilled off. After the reaction, the polymer thus obtained was extruded in a rope-like form from the bottom portion of the polycondensation reaction reactor. The rope-like polymer was cut to give pellets having an intrinsic viscosity of 0.5 dl/g and a weight of 25 mg/pellet.

The pellets thus obtained were placed in a sample mill (trade name of SM-1, manufactured by Iuchi Seieido Corp.), and milled at a maximum speed for 1 minute to give a PTT composition particle prepolymer. The prepolymer had a particle size of 1 mm, a particle weight of 0.95 mg/particle, a terminal carboxyl group content of 32 meq/kg, and a cyclic dimer content of 2.7% by weight.

The prepolymer thus obtained was heated at 200° C. for 15 minutes to be crystallized, and subjected to solid-state polymerization at 205° C. at a vacuum degree of 5 Pa. Table 1 shows the physical properties of the PTT composition particles thus obtained. The PTT composition particles thus obtained were excellent in whiteness and oxidation resistance stability, and had a decreased cyclic dimer content.

Next, a spinning experiment was carried out in the following manner.

The PTT composition particles obtained in Example 1 or 2 were dried at 130° C. to have a moisture content of 50 ppm or less, and melted at 260° C. and extruded with a twin-screw extruder. The extruded yarn was wound at a rate of 1,600 m/min (each package having a weight of 3 kg) to give an undrawn yarn. In addition, the residence time during melting was about 10 minutes.

The undrawn yarn thus wound was hot drawn so that the elongation became 40% by passing the yarn through hot rolls at 55° C. and a hot plate at 140° C. to give a filaments yarn of 84 dtex/36 f. The spinning experiment was carried out for 3 days, and neither yarn breakage nor fluff formation was observed during the winding step and drawing step of the undrawn yarn.

EXAMPLE 4 AND 5

The procedure of Example 1 was repeated except that the solid-state polymerization was carried out under conditions explained below.

The PTT composition particle prepolymer was crystallized under the following conditions: the prepolymer was heated at 210° C. for 15 minutes by the outer wall of an apparatus while nitrogen gas heated at 207° C. was being allowed to flow at a flow rate (superficial velocity) of 100 cm/min in terms of a standard state; the crystallized PTT composition particle prepolymer was charged into a solid-state polymerization apparatus, and heated at 205° C. by the outer wall while a nitrogen gas heated at 205° C. was being allowed to flow at a flow rate (superficial velocity) of 100 cm/min in terms of a standard state to effect solid-state polymerization and give PTT composition particles. Table 1 shows a solid-state polymerization time.

The PTT composition particles thus obtained were excellent in whiteness and oxidation resistance stability, and had a decreased cyclic dimer content.

Next, a spinning experiment was carried out in the following manner.

The PTT composition particles obtained in Example 4 or 5 were dried at 130° C. to have a moisture content of 50 ppm or less, and melted at 260° C. and extruded with a twin-screw extruder. The extruded yarn was wound at a rate of 1,600 m/min (each package having a weight of 3 kg) to give an undrawn yarn. The residence time during melting was about 10 minutes.

The undrawn yarn thus wound was hot drawn so that the elongation became 40% by passing the yarn through hot rolls at 55° C. and a hot plate at 140° C. to give a filaments yarn of 84 dtex/36 f. The spinning experiment was carried out for 3 days, and neither yarn breakage nor fluff formation was observed during the winding step and drawing step of the undrawn yarn.

EXAMPLE 6 AND 7

Dimethyl terephthalate in an amount of 1,300 g (6.7 moles), 1,144 g (15 moles) of PDO and 0.78 g of titanium butoxide were charged into a 3-liter autoclave equipped with plate-like blades. A transesterification reaction was carried out at 220° C. while methanol was being distilled off. The transesterification reaction ratio was 95%. After finishing the transesterification reaction, the reaction products thus obtained were atomized by applying a nitrogen gas pressure of 0.5 MPa, and sprayed to give particles. The particles thus obtained had a particle size of 0.3 mm, a particle weight of 0.3 mg/particle, a terminal carboxyl group content of 30 meq/kg, and a cyclic dimer content of 2.7% by weight.

The particles thus obtained were heated from 70° C. to 200° C. in one hour at a vacuum degree of 5 Pa to be crystallized. The molecular weight increased during heating. The particles were then subjected to solid-state polymerization at 205° C. at a vacuum degree of 5 Pa to give PTT composition particles. Table 1 shows a solid-state polymerization time and the physical properties of the PTT composition particles thus obtained. The PTT composition particles thus obtained were excellent in whiteness and oxidation resistance stability, and contained cyclic dimer in a decreased amount.

EXAMPLE 8

The procedure of Example 1 was repeated except that terephthalic acid was used in place of dimethyl terephthalate in the same amount in terms of moles while water was being distilled off.

The granular prepolymer had a particle size of 1.0 mm, a weight of 0.95 mg/particle, a terminal carboxyl group content of 34 meq/kg, and a cyclic dimer content of 2.6% by weight.

The PTT composition particles thus obtained were excellent in whiteness and oxidation resistance stability, and had a decreased cyclic dimer content.

EXAMPLE 9

The PTT composition particles obtained in Example 1 were left in a steam atmosphere at 205° C. for 1 hour, and then dried. Although the PTT composition particles then showed no significant changes in physical properties, they contained cyclic dimer in an amount as small as 1.0% by weight after the melting test at 260° C. Moreover, the PTT composition particles were subjected to a light-resistance test with a fadeometer at 83° C. for 100 hours, and showed no substantial yellowness.

When the PTT composition particles that were obtained in Example 1 and that were not treated with steam were subjected to a remelting test at 260° C. for 30 minutes, they contained 1.8% by weight of cyclic dimer in contrast to the above results. Moreover, the PTT composition particles were subjected to a light-resistance test with a fade-ometer at 83° C. for 100 hours, and showed yellowness to a certain degree.

In addition, as a result of subjecting the PTT composition particles having been treated with steam to solid-state polymerization at 205° C. for 1 hour at a vacuum degree of 5 Pa, they showed no increase in intrinsic viscosity. The results show that the catalyst is deactivated by the steam treatment.

EXAMPLE 10

The PTT composition particles obtained in Example 1 were left in 1% by weight of an aqueous phosphoric acid solution at 130° C. for 1 hour, and then dried. Although the PTT composition particles thus obtained showed no significant changes in physical properties, they contained, after the melting test at 260° C., cyclic dimer in an amount as small as 0.9% by weight. Moreover, the PTT composition particles were subjected to a light-resistance test with a fade-ometer at 83° C. for 100 hours, and showed no substantial yellowness.

In addition, as a result of subjecting the PTT composition particles having been treated with the aqueous phosphoric acid solution to solid-state polymerization at 205° C. for 1 hour at a vacuum degree of 5 Pa, they showed no increase in intrinsic viscosity. The results show that the catalyst is deactivated by the aqueous phosphoric acid solution treatment.

COMPARATIVE EXAMPLE 1

The procedure of Example 1 was repeated except that the melt polycondensation was carried out at a polycondensation temperature of 280° C. The prepolymer pellets thus obtained showed an intrinsic viscosity of 0.7 dl/g, $L^*$ of 74 and $b^*$ of 7.0, contained 40 meq/kg of terminal carboxyl groups and 2.9% by weight of cyclic dimer, strongly colored yellow, and had a dull color tone.

In the same manner as in Example 1, the pellets were ground to give particles, and the particles were subjected to solid-state polymerization. The solid-state polymerization rate was low. Moreover, because the PTT composition particles thus obtained contained terminal carboxyl groups in a large amount, they were greatly colored, and were drastically colored during drying heat treatment.

COMPARATIVE EXAMPLE 2

The procedure of Example 1 was repeated except that the prepolymer pellets having a weight of 25 mg/pellet (each pellet having a cylindrical form 2.4 mm in diameter and 4.0 mm in height) were subjected to solid-state polymerization without grinding the pellets. The PTT composition particles thus obtained had an intrinsic viscosity of 0.61 dl/g.

EXAMPLE 11

The PTT composition particles obtained in Example 3 were dried under a nitrogen stream at 130° C. to have a moisture content of 10 ppm. The dried particles were fed to an extruder, and melted at 290° C. The molten material was extruded through round-shaped spinning orifices (0.23 mm (in diameter)×2500). No screw pressure variation was observed in the extruder, and spinning was conducted smoothly.

Cold air at 20° C. and a relative humidity of 90% was blown against the filaments thus extruded, at a speed of 0.4 m/sec so that the filaments were cooled and solidified. A finishing agent was imparted to the solidified filaments, and the filaments were wound at a rate of 1,600 m/min to give an undrawn yarn. The undrawn yarn thus otained was subsequently drawn by passing it through hot rolls at 55° C. and a hot plate at 140° C. so that the elongation became about 40%, to give a drawn yarn of 500 dtex/250 f. The drawn yarn thus obtained showed a strength of 5.3 cN/dtex and an elastic modulus of 25 cN/dtex.

Three PTT yarns thus obtained were doubled and twisted with both the first and the second twist being at 390 T/m to give a raw cord of 1,500 dtex/750 f. The raw cord was coated with an RFL solution containing 20% by weight of a resin. The raw cord was then dried at 130° C. and at 225° C. with a drying machine so that the resin coating ratio became 5% by weight to give a tire cord.

A bias tire was prepared from the tire cord thus obtained, and subjected to a rotation test.

A 1-ton passenger car was assumed to be driven on an asphalt surface at 35° C. at a speed of 200 km/hr, and a rotation test on the tire was performed for 96 hours by rotating the tire at the same speed while the same contact pressure was applied thereto.

After the rotation test for 96 hours, the tire cord was taken out of the tire, and a strength retention ratio was measured. As a result, it was found that no substantial lowering of the strength took place.

EXAMPLE 12

The composition particles in Example 1 and the polymer pellets in Comparative Example 2 were left in a room for a month. The particles and the pellets were subjected to a drying test.

When the particles and the pellets were maintained in a dried air at 160° C., it took 3 hours until the moisture content of the composition particles in Example 1 attained 50 ppm or less, and it took 15 hours until the moisture content of the polymer pellets in Comparative Example 2 attained 50 ppm or less. The composition particles in Example 1 then showed no change in b*, whereas the polymer pellets in Comparative Example 2 showed an increase in b* of 0.4.

The composition particles in Example 1 that were dried to have a moisture content of 40 ppm were melted with an extruder and the molten material could be stably discharged even at 247° C. On the other hand, when the polymer pellets in Comparative Example 2 that were dried to have a moisture content of 40 ppm were processed in the same manner, they were incompletely melted, and the pressure varied greatly.

TABLE 1

| | Solid-state polymerization | | [η] (dl/g) | Particles | | Amount (%) of passed Particles | |
|---|---|---|---|---|---|---|---|
| | Temp. (° C.) | Time (hr) | | Size (mm) | Weight (mg/particle) | 10 mesh | 500 mesh |
| Ex. 1 | 205 | 3 | 0.92 | 1.0 | 0.96 | 96 | 1 |
| Ex. 2 | 205 | 5 | 1.30 | 1.0 | 0.96 | 95 | 3 |
| Ex. 3 | 205 | 10 | 1.67 | 1.0 | 0.96 | 97 | 1 |
| Ex. 4 | 207 | 3 | 0.95 | 1.0 | 0.96 | 95 | 3 |
| Ex. 5 | 207 | 5 | 1.32 | 1.0 | 0.96 | 95 | 2 |
| Ex. 6 | 205 | 3 | 1.05 | 0.3 | 0.15 | 98 | 2 |
| Ex. 7 | 205 | 5 | 1.40 | 0.3 | 0.15 | 99 | 2 |
| Ex. 8 | 205 | 3 | 0.91 | 1.0 | 0.96 | 95 | 2 |
| Ex. 9 | 205 | 3 | 0.92 | 1.0 | 0.95 | 97 | 1 |
| Ex. 10 | 205 | 3 | 0.93 | 1.0 | 0.95 | 96 | 2 |
| Comp. Ex. 1 | 205 | 3 | 0.79 | 1.0 | 0.94 | 95 | 1 |
| Comp. Ex. 2 | 205 | 3 | 0.61 | 4.0 | 25.5 | 1 | 0 |

TABLE 1-continued

| | Terminal carboxyl group content (meq/kg) | Cyclic dimer content (wt. %) | L* | b* | Oxidation resistance stability |
|---|---|---|---|---|---|
| Ex. 1 | 23 | 0.9 | 88 | 1 | 18 |
| Ex. 2 | 20 | 0.8 | 89 | 2 | 19 |
| Ex. 3 | 20 | 0.6 | 90 | 2 | 19 |
| Ex. 4 | 15 | 0.8 | 89 | 1 | 18 |
| Ex. 5 | 13 | 0.7 | 90 | 2 | 19 |
| Ex. 6 | 8 | 0.6 | 91 | 0 | 15 |
| Ex. 7 | 9 | 0.5 | 91 | 0 | 15 |
| Ex. 8 | 25 | 0.7 | 90 | 1 | 19 |
| Ex. 9 | 22 | 0.9 | 89 | 1 | 17 |
| Ex. 10 | 25 | 0.9 | 90 | 1 | 16 |
| Comp. Ex. 1 | 30 | 2.6 | 83 | 7 | 26 |
| Comp. Ex. 2 | 25 | 1.2 | 88 | 3 | 21 |

INDUSTRIAL APPLICABILITY

The PTT composition particles of the present invention are excellent in whiteness, oxidation resistance stability, moldability and uniformity, and the particle shape is fine and uniform. The PTT composition particles therefore show a significant heat transfer effect, and have at least one of such excellent effects as shortening the drying time and inhibiting thermal deterioration of the particles due to lowered extrusion temperature. Accordingly, when the PTT composition particles of the invention are used as a raw material, a fiber (spun without yarn breakage), a film, or the like, of high quality can be produced with high productivity.

The invention claimed is:

1. A process for producing poly(trimethylene terephthalate) composition particles comprising the following steps (1) to (4):
   (1) a step of reacting terephthalic acid and/or a lower alcohol ester derivative of terephthalic acid with 1,3-propanediol in the presence of a catalyst having polycondensation activity to form 1,3-propanediol ester of terephthalic acid and/or a polymer thereof;
   (2) a step of granulating the 1,3-propanediol ester of terephthalic acid and/or a polymer thereof obtained in the step (1) to produce composition particles having a particle size of 3 mm or less, and a particle weight of less than 1 mg/particle;
   (3) a step of heating the composition particles to subject the particles to solid-state polymerization, whereby the intrinsic viscosity is increased by 0.1 dl/g or more; and
   (4) a step wherein the composition particles obtained in the step (3) are subjected to a step comprising contacting the particles with a polar compound of at least one substance selected from the group consisting of water, methanol, phosphoric acid, hydrogen chloride, sulfuric acid and ammonia at a temperature of 50° C. or above and for 60 minutes or less in order to deactivate a part of or the entire polycondensation activity of the catalyst.

2. The process for producing poly(trimethylene terephthalate) composition particles according to claim 1, wherein the step of granulating the 1,3-propanediol ester of terephthalic acid and/or a polymer thereof is at least one of the following methods (1) to (3):
(1) a method comprising extruding the ester and/or the polymer in a molten state, and then cutting the extruded material;
(2) a method comprising atomizing the ester and/or the polymer in a foggy state, and then finely granulating the atomized material; and
(3) a method comprising solidifying the ester and/or the polymer, and then crushing the solidified material.

3. The process for producing poly(trimethylene terephthalate) composition particles according to claim 2, wherein 95% or more of the particles pass through a 10-mesh filter, and 5% or less of the particles pass through a 500-mesh filter.

4. The process for producing poly(trimethylene terephthalate) composition particles according to claim 1 or 2, wherein prior to the solid-state polymerization, the composition particles have a terminal carboxyl group content originating from the polymer of 1,3-propanediol ester of terephthalic acid of 35 meq/kg or less.

5. Poly(trimethylene terephthalate) composition particles produced by the process according to claim 1.

6. A molded article prepared by molding the poly(trimethylene terephthalate) composition particles according to claim 5.

7. A fiber prepared by molding the poly(trimethylene terephthalate) composition particles according to claim 5.

* * * * *